United States Patent [19]
Gruett

[11] 4,260,487
[45] Apr. 7, 1981

[54] COMBINATION FILTER AND SOFTENER UNIT

[76] Inventor: Glenn H. Gruett, 303 S. Victoria St., Appleton, Wis. 54911

[21] Appl. No.: 63,460

[22] Filed: Aug. 3, 1979

Related U.S. Application Data

[63] Continuation of Ser. No. 908,230, May 22, 1978, abandoned.

[51] Int. Cl.³ .................................................. C02F 1/42
[52] U.S. Cl. ...................................... 210/190; 210/278
[58] Field of Search ............ 210/30 R, 32, 35, 38 A, 210/38 B, 63 R, 190, 191, 269, 275, 277, 278, 288, 439, 28, 50, 73 R, 79–82

[56] References Cited

U.S. PATENT DOCUMENTS

| | | | |
|---|---|---|---|
| 1,947,248 | 2/1934 | Burks | 210/38 A |
| 3,216,931 | 11/1965 | Dennis et al. | 210/190 |
| 3,385,441 | 5/1968 | Lyall | 210/288 |
| 3,762,550 | 10/1973 | Jarr et al. | 210/190 |

*Primary Examiner*—Ivars C. Cintins
*Attorney, Agent, or Firm*—McWilliams, Mann & Zummer

[57] ABSTRACT

This invention combines the functions of filtering and softening water in a unitary system utilizing a single apparatus. The combined system first oxidizes and filters sulphur, manganese and iron and then softens by an ion exchange process using sodium chloride as the exchange chemical. The filtering process removes precipitated concentrations of iron, manganese and hydrogen sulphide gas through the use of a manganese treated zeolite material known as "Manzite". This system, provides a combined operation utilizing one water treating tank containing a filter substance such as the manganese treated zeolite, which draws from an associated chemical holding tank and a brine tank in performing the described functions in a single apparatus.

7 Claims, 7 Drawing Figures

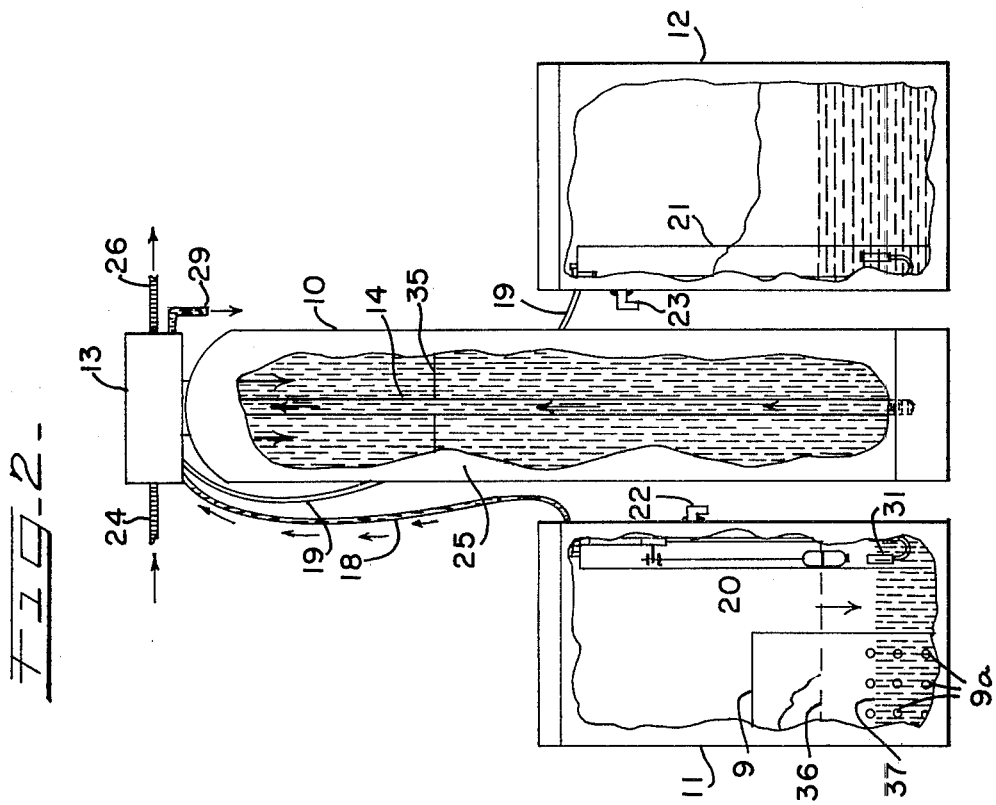
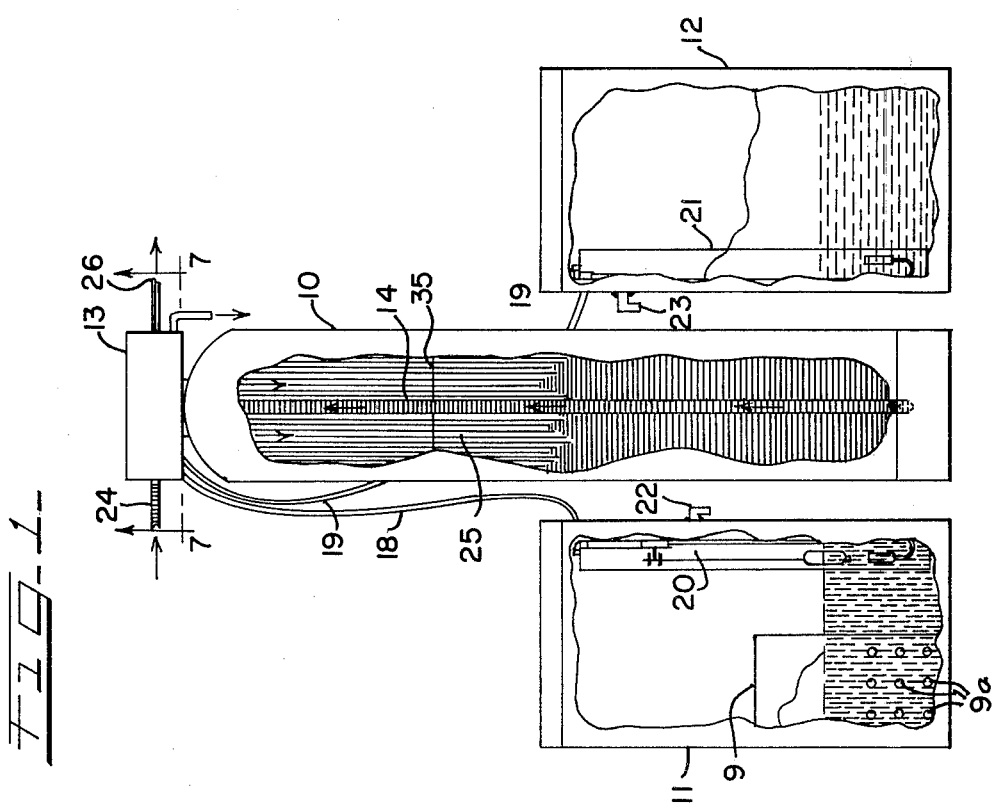

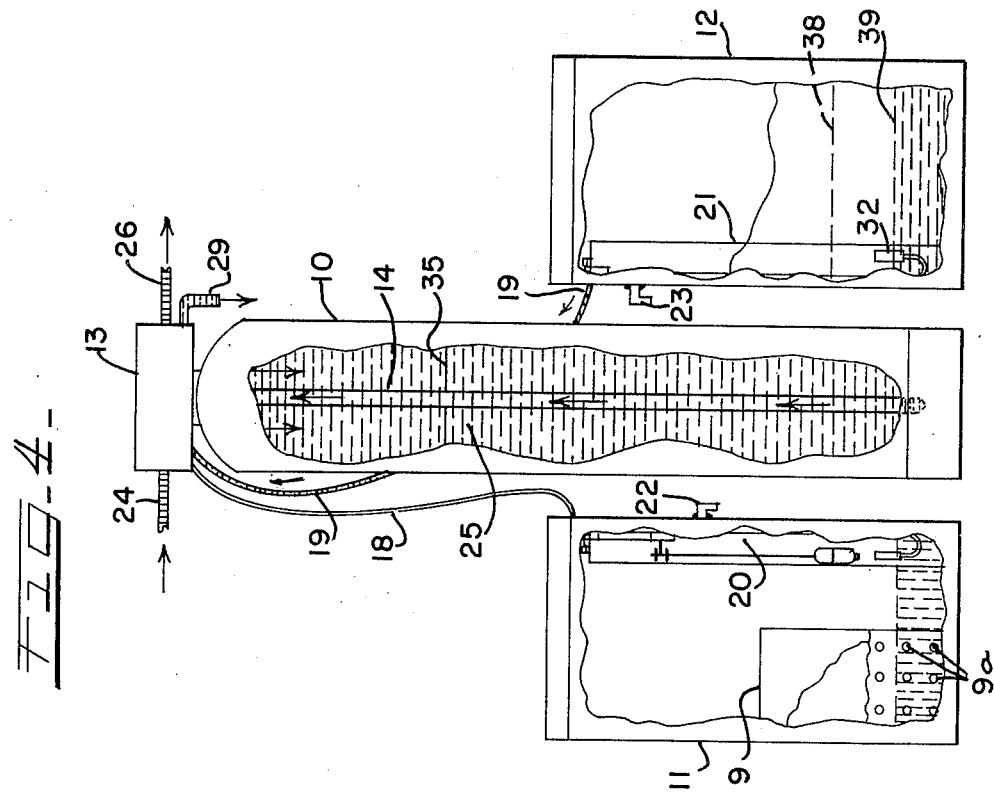
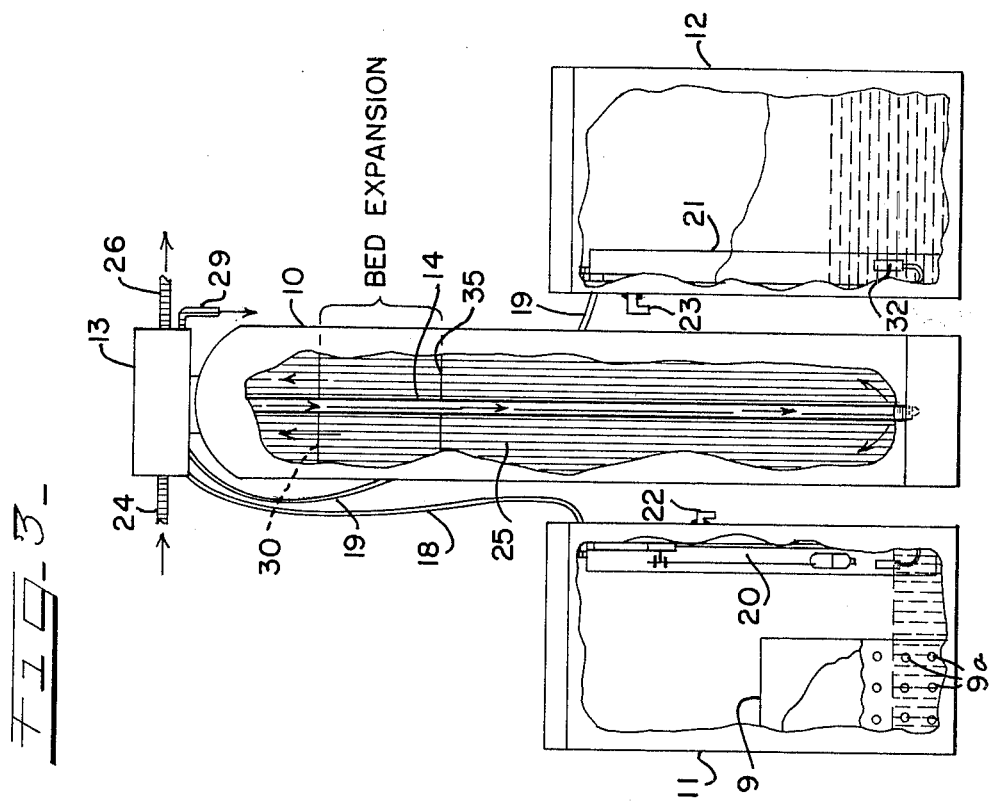

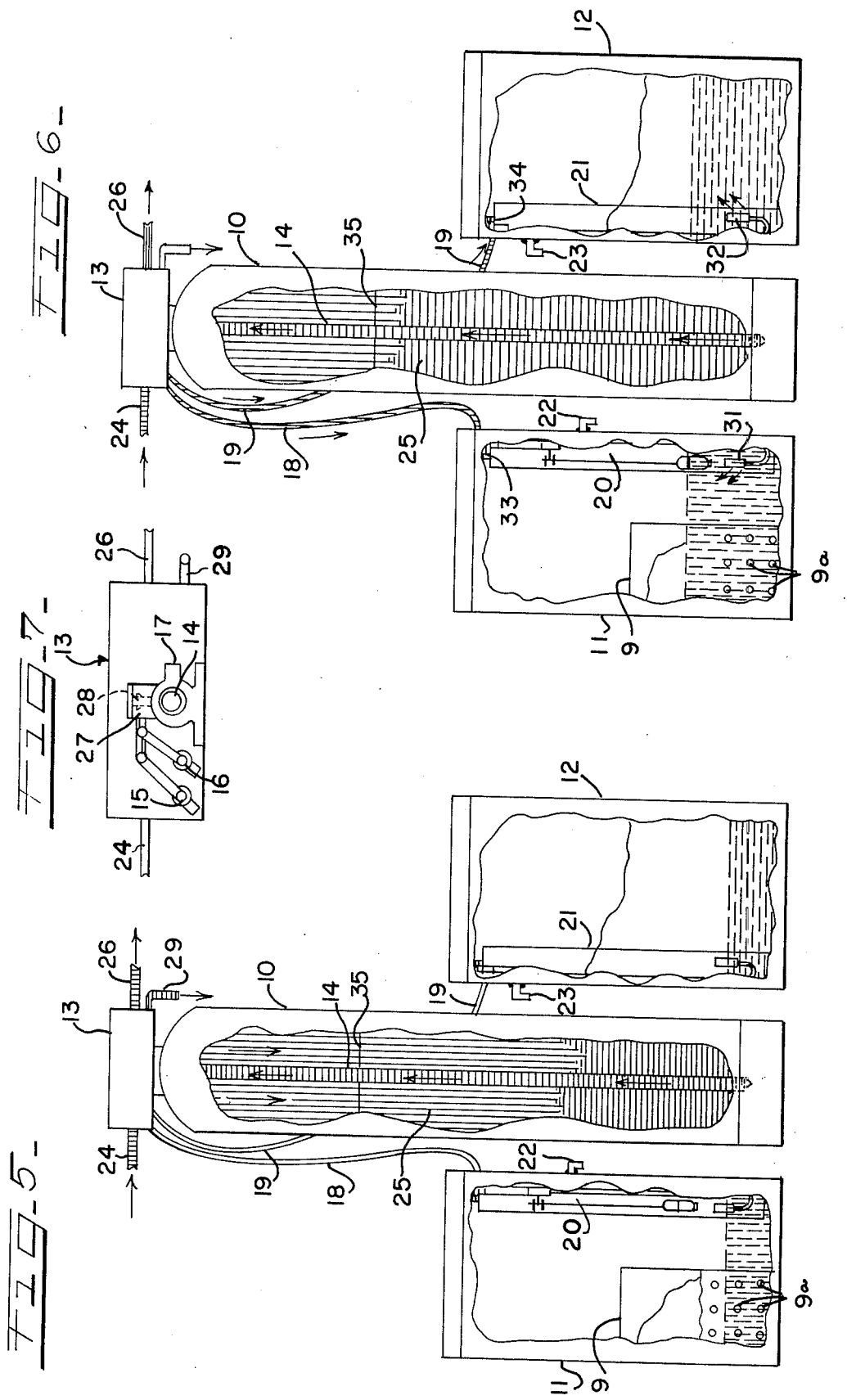

COMBINATION FILTER AND SOFTENER UNIT

This is a continuation of application Ser. No. 908,230, filed 5-22-78, now abandoned.

BACKGROUND OF THE INVENTION

The typical water softening system known in the prior art treats the water by removing calcium, magnesium and any of the hardness cations that can be exchanged for sodium in an ion exchange process. Where prior systems provided an additional filtering function it was necessary to utilize two tanks, one containing a filter substance and a separate tank containing an ion exchange material and it was necessary to resort to a system of exchanging such tanks by delivering one tank for the oxidizing process and a separate tank for the softening operation. Such tanks are carried in and out of homes, or buildings, and regenerated at a central shop in mass quantities.

SUMMARY OF THE INVENTION

The primary purpose of this invention is to filter and soften water in one set of equipment comprising a single apparatus. The materials which this system filters out of the water comprise iron, manganese and sulphur, in the form of $H_2S$, commonly known as hydrogen sulfide gas. The invention combines the systems of filtering and softening in a unitary operation where both systems function in an apparatus utilizing but one water tank containing filtering material which is regenerated through the use of two substances to accomplish a multi-purpose objective. The combined system operates with an exchange media in the tank comprising a manganese treated zeolite. During the normal service cycle, when water is flowing through the exchange media concentrations of iron, manganese and hydrogen sulphide gas will be oxidized and precipitated. This precipitate will be filtered by the zeolite material comprising "Manzite" and the hardness materials in the water will be exchanged for sodium. When the oxidization ability of the material bed is reduced the sodium level is depleted and the filtering and softening material must be regenerated.

Restoration of oxygen to the mineral is accomplished by the use of a chemical such as potassium permanganate, which is stored in the system in a separate holding tank and drawn through the water treatment tank unit, after which the residual permanganate is rinsed out of the system. This has the effect of restoring the oxygen and the oxidizing quality to the mineral. After this reoxydization of the system it is treated with a brine solution drawn from a separate tank in the system containing salt brine, which restores the sodium content of the mineral bed. The system is thoroughly rinsed and backwashed, after which both the holding tank and the brine tank may be refilled and the system returned to normal service.

This combined unitary system provides the user with water of the highest quality and in fact, superior to that obtained in prior replaceable tank systems. In such prior arrangement it happened on occasion that the manganese was stripped off of the chemical bed which caused a red discoloration of the water. This cannot happen with the present system because the manganese, in these circumstances, will be exchanged within the filtering media for sodium and further, by this combined system, the possibility of manganese stripping has been lessened, thereby yielding higher quality water that is not obtainable without using the combined process of this system. The primary novelty of this combined system resides in the accomplishment of the two functions with one material in the single treating tank and regenerating this filtering and softening material in the manner described. In effect, the material is regenerated with two separately utilized chemicals for the purpose of oxidation and ion exchange where prior systems have had to resort to two separate operations, as distinguished from the single treatment tank operation of this invention.

OBJECTS OF THE INVENTION

The primary objective of this invention is the treatment of water in a unitary apparatus which both filters and softens the water.

The principal object of the invention is the provision of a water treatment system which utilizes a material that both filters and softens the water and which is regenerated by separate chemicals used for oxidation and ion exchange.

An important object of the invention is to provide an apparatus for combined water treatment, utilizing a single water treatment tank in association with separate chemical holding tanks for regeneration of the contents of the treatment tank to restore the oxygen and the oxidizing quality of the treatment material and then to restore the sodium content of the material.

A more specific object of the invention provides an apparatus for both filtering and softening water in a common treatment tank containing a filter media, in association with a chemical holding tank containg a solution for regenerating the media to restore its oxydizing quality and also associated with a brine tank containing salt brine for regenerating the media to restore its sodium content.

A still more specific object of the invention provides a water treatment tank containing a filter media such as a manganese treated zeolite, in operative relation with a chemical holding tank containing a chemical such as potassium permanganate and also operatively associated with a brine tank containing a brine solution, wherein, when the oxidation ability of the zeolite is reduced and the sodium level thereof is depleted, the chemical from the holding tank will be drawn through the zeolite bed which is then rinsed. The bed is then treated with the brine solution drawn from the brine tank, after which the system is thoroughly rinsed and backwashed, thus restoring the oxidizing quality of the zeolite bed and restoring its sodium content.

DESCRIPTION OF THE DRAWINGS

The foregoing and other and still more specific objects of the invention are attained by the system and apparatus illustrated in the accompanying drawings, wherein FIG. 1 is an illustration of the inventive apparatus including the water treatment tank in operative association with the chemical holding tank and the brine tank, with the system shown in the general operating service condition;

FIG. 2 is a generally similar view but with the system shown under the condition of drawing chemical from the holding tank through the treatment tank and rinse;

FIG. 3 is a similar illustration of the system under backwash conditions;

FIG. 4 is a similar view of the system under the conditions of drawing brine from the brine tank through the treatment tank and rinse;

FIG. 5 is a similar view showing the system under rapid rinse conditions;

FIG. 6 is a similar illustration of the invention showing the system under the condition of refilling the solution tanks; and FIG. 7 is a detail view of the control valve.

DESCRIPTION OF PREFERRED EMBODIMENT

In the drawings, the water treatment tank is shown at 10, the chemical holding tank is illustrated in operative association therewith at 11 and the brine tank, also operatively connected with the treatment tank, is shown at 12. A control valve, which may comprise the Fleck Valve manufactured by L. W. Fleckenstein, Inc., is shown at 13. A distributor tube 14 extends vertically of the water tank 10 from the bottom thereof to the top and is operatively connected with the control valve 13. The control valve includes a chemical valve 15, a brine valve 16 and a drain part 17. The chemical tank 11 is operatively connected to control valve 13 by means of the valve 15 through a tube 18 leading from the float control housing 20 through a flow control 33 and the brine tank is operatively connected with the control valve by means of the valve 16 through a tube 19 which extends from the well 21 through a flow control 34. The chemical tank 11 contains a safety float device which may comprise the Fleck 2200 assembly manufactured by L. W. Fleckenstein, Inc., contained in a PVC well 20, and the brine tank 12 contains a chemical well 21. An overflow 22 is provided on the chemical tank 11 and a similar overflow 23 is provided on the brine tank. All of these devices specifically referred to comprise typical elements available for use in water treatment systems and are not claimed specifically herein apart from the combination of parts defined as the unitary system of this inventive concept.

In the service position of this water treatment system, as shown in FIG. 1, the flow of water to be treated, which is hard water, is into the control valve 13 by means of inlet 24 from a suitable source of supply and thence downwardly through the mineral bed 25 in the treatment tank 10. The normal level of this bed 25 is indicated by the reference 35. The water is conditioned by intimate contact with the zeolitic mineral bed 25 and the conditioned water then enters the central tube 14 at the bottom and flows upwardly through the tube to the control valve and thence outwardly through the outlet 26 for use as the source of a conditioned water in the building, or residence, containing the installation.

In the position of the system illustrated in FIG. 2, hard water enters the control valve 13 at the inlet 24 and flows into an injector housing 27 and downwardly through injector nozzle and orifice 28 to draw potassium permanganate solution from the tank 11 by means of the tube 18 and cause this solution to flow downwardly through the mineral bed 25 to reoxidize the bed. This solution then enters the central tube 14 at the bottom and flows upwardly through this tube to the control valve 13 where it is directed outwardly through a drain line 29. An air check valve 31 is closed when the potassium permanganate solution reaches a low point in the holding tank 11, while rinse water continues to flow through the treatment tank to rinse this chemical from the mineral bed 25. The control valve 13 is shown in greater detail in FIG. 7, where it is illustrated as seen from the bottom with the tube 14 entering the valve and the chemical and brine valves 15 and 16, respectfully, shown at one side thereof, with lever connections into the injector housing 27.

In the backwash position of the system as shown in FIG. 3, the hard water enters the control valve 13 at the inlet 24 and is directed by the control valve downwardly through the central tube 14 and out of the bottom end thereof to then flow upwardly through the mineral bed 25. The mineral bed 25 thus is lifted and agitated and filtered matter is washed out through the drain 29 by this reverse flow. The speed of the backwash operation is regulated by a suitable flow control valve (not shown) incorporated in the control valve assembly 13 and normally located in the housing for the drain. It will be noted that the mineral bed 25 expands by approximately thirty per cent (30%) during the backwash operation and this expansion is indicated by the broken line 30 in FIG. 3. In other words the depth of the mineral bed 25 increases by approximately thirty per cent (30%) during backwash.

In the brine drawing and rinse position of the system illustrated in FIG. 4 the hard water enters the control valve 13 at the inlet 24 where it is directed downwardly through the nozzle and orifice 28 to draw brine solution from the brine tank 12 by means of the tube 19 and which flows downwardly through the mineral bed thereby regenerating the bed to restore the sodium content. The brine solution then enters the central tube 14 at the bottom and flows upwardly through this tube to enter the control valve 13 which causes the solution to be discharged through the drain 29. When the brine solution reaches its low point in the tank 12 an air check valve 32 closes while the rinse water continues to flow through the mineral bed to rinse the brine therefrom.

In the rapid rinse position of the system as shown in FIG. 5, the hard water enters the control valve 13 at the inlet 24 from whence it is directed to flow downwardly through the mineral bed 25 and then enters the central tube 14 at the bottom and flows upwardly through this central tube to the control valve 13 again, where it is directed to be discharged through the drain 29. This rapid rinse operation serves to rinse all remaining traces of potassium permanganate from the mineral bed 25 while at the same time removing any traces of brine remaining in the mineral bed.

In the refill position of the system illustrated in FIG. 6, the hard water enters the control valve 13 at the inlet 24, where it is directed through injector nozzle orifice 28, the valves 15 and 16 and flow controls 33 and 34 into the holding tank 11 and the brine tank 12 to fill both tanks. The residual air from preceding cycles that is trapped at the top of either tank at this time, is utilized to blow through the injector nozzle and the valves to clean any foreign matter from these assemblies.

The chemical holding tank 11 includes a PVC saturator 9 containing openings $9^a$ equally spaced around its peripheral surface and is lined with a fiber glass screen bonded to the inside walls and bottom.

A normal solution level in the chemical holding tank 11 is arrived at by a time fill control through the chemical valve 15 and the flow control 33. The safety valve assembly 20 provides a shut-off at the level of the overflow 22 in the event the chemical valve 15 should fail to function for any reason and should the safety valve mechanism fail the overflow 22 affords a drain facility.

The direction of the flow of water and of the chemical, as well as the brine solution, is clearly indicated by arrows in the several drawing figures illustrating the functioning of this treatment system under the various operating conditions. In the normal operating condition the water enters the treatment tank 10 at the top from the valve 13 and flows downwardly through the media 25 for treatment. This operation results in a supply of treated water which may approximate about half the depth of tank 10 as clearly revealed in FIG. 1. As water is drawn from the valve outlet 26, treated water flows from this treated supply into the bottom of the central vertical tube 14 and thence to the outlet 26. As the treated water in the tank is withdrawn in this manner additional untreated hard water is drawn downwardly through the mineral bed 25 for treatment and to maintain the supply of treated water.

In the position of the system of drawing the chemical from tank 11, as shown in FIG. 2, it will be seen that the mineral bed 25 in the treatment tank 10 is fully immersed in the potassium permanganate solution for effective reoxidization of the mineral bed. During this operation the normal level of the chemical solution in holding tank 11 is lowered as the solution is drawn into the treatment tank so that the normal level recedes from its position indicated at 36 in this Figure to a low point approximating level 37.

In the backwash position of the system the mineral bed 25 is thoroughly flushed and as shown in FIG. 3 the treatment tank, of course, is completely filled with fresh water and after the completion of this phase of the systems operation it progresses to the next operational step of treating the bed 25 with the brine solution. This is shown in FIG. 4 where it will be seen that the treatment tank 10 is completely filled with the brine solution. During this operation the level of the brine solution in the brine tank 12 recedes from the normal level indicated at 38 in this Figure to its approximate low point indicated at 39. Any bypass water flowing through the control valve 13 during the chemical treatment operation, or during the brine treatment of the mineral bed 25, of course, will comprise hard water as indicated by the bypass through the outlet 26 and as shown in FIGS. 2, 3, 4 and 5 this holds throughout the treatment process until the tanks 11 and 12 refill.

During the rapid rinse operation it will be seen from FIG. 5 that treated water in the tank 10 begins to accumulate which normally follows the complete flushing out of the treatment chemical. As shown in FIG. 6 the system is being restored for normal use upon the refilling of the tanks 11 and 12.

The primary purpose of this system is to both filter and soften water by a treatment process that utilizes a material such as manganese treated zeolites to filter out of the water high concentrations of iron, manganese and sulphur, this latter being in the form of $H_2S$, or hydrogen sulfide gas and then soften the water by removing calcium magnesium and any of the hardness cations that would be exchanged for sodium in an ion exchange process that utilizes the same material, or media, for performing both operations. The system combines both functions by first oxidizing and filtering the sulphur, manganese and iron and then soften the water by an ion exchange process utilizing sodium chloride as the exchange chemical, all of which is accomplished in a treatment tank containing a mineral bed that is regenerated by utilizing two chemicals, such as potassium permanganate for the one purpose and then sodium chloride for the softening, whereby the one mineral bed accomplishes a multiple function, utilizing but one material to achieve this objective.

As hereinbefore set forth, the exchange media 25 comprising manganese treated zeolites, is disposed in the treatment tank 10 and in normal operation, as water flows through this media, iron, manganese and $H_2S$ will be oxidized and precipitated. The resulting precipatate will be filtered by the media and the hardness materials in the water will be exchanged for sodium. Regeneration of the media 25 occurs when the oxidization ability thereof is reduced and the sodium level depleted. This is done by first treating the media with the potassium permanganate and rinsing and then treat the media with the brine solution and subsequent thorough rinsing whereupon the media 25 is again ready to perform its dual function of filtering and softening.

From the foregoing it will be seen that this system of water treatment performs the dual functions of filtering and softening water while utilizing a single material for both functions and wherein the material is regenerated first by a chemical solution drawn through the material from a holding tank and then by a brine solution drawn from a brine tank, with thorough rinsing operations after each such treatment of the material by the solutions.

What is claimed is:

1. A water treatment system consisting of a single treatment tank containing a single media material for both filtering and softening the water, said media material consisting of a manganese containing exchangeable treated zeolite sodium ions to oxidize and precipitate iron, manganese and $H_2S$, and to soften the water, a holding tank containing a chemical comprising potassium permanganate to restore oxygen to the zeolite, a brine tank containing a brine solution to restore the sodium ion content of the zeolite, a water supply source, a control valve operatively connected with said supply source, with said treatment tank, with said holding tank and with said brine tank, said valve being capable of controlling the flow of potassium permanganate solution from the holding tank to the treated zeolite to restore oxygen to the zeolite, the flow of brine solution from the brine tank to the zeolite to restore the sodium ion content of the zeolite and the flow of water to the zeolite to rinse the zeolite, said valve constructed and arranged to operate in sequence to direct said potassium permanganate solution from the holding tank into the manganese treated zeolite and then direct water into the zeolite to rinse out the residual permanganate, then direct brine solution from the brine tank into the zeolite to restore the sodium ion content of the zeolite, and then direct water into the zeolite again to rinse the zeolite.

2. A water treatment system as set forth in claim 1 wherein said treatment tank includes a central vertical tube operatively connected with said control valve, said valve including means for directing incoming water downwardly in the treatment tank through said media material and upwardly through said tube after treatment to said valve for dispensing into an installation.

3. A water treatment system as set forth in claim 1 wherein said valve includes means for directing chemical from said holding tank into the treatment tank to treat the media material, said chemical being directed downwardly through the media material, and including a central vertical tube operatively connected with the control valve, said chemical flowing downwardly through the media material and upwardly into said tube from adjacent the bottom thereof to return to said valve and be discharged to drain.

4. A water treatment system as set forth in claim 3 wherein said control valve includes means for directing incoming water downwardly through said central tube to flow upwardly in the treatment tank from adjacent the bottom of said tube to rinse said media material and return to said valve for discharge to drain.

5. A water treatment system as set forth in claim 1 wherein said valve includes means for directing brine solution from said brine tank downwardly through the media material, and including a central vertical tube in the treatment tank operatively connected with said control valve, said brine solution after treating the media material flowing upwardly through said tube from adjacent the bottom thereof to said valve for discharge to drain.

6. A water treatment system as set forth in claim 5 wherein said valve includes means for directing incoming water downwardly through the media material and thence upwardly through said tube from adjacent the bottom thereof to said central valve for discharge to drain.

7. A water treatment system as set forth in claim 1 wherein said control valve includes means for directing incoming water into said holding tank and into the brine tank to refill these tanks to their normal operating level.

* * * * *